(12) United States Patent
Lusk et al.

(10) Patent No.: US 8,336,421 B2
(45) Date of Patent: Dec. 25, 2012

(54) SPHERICAL THREE DEGREES OF FREEDOM PLATFORM

(75) Inventors: Craig Lusk, Lutz, FL (US); Larry L. Howell, Orem, UT (US)

(73) Assignee: Brigham Young University, Provo, UT (US)

( * ) Notice: Subject to any disclaimer, the term of this patent is extended or adjusted under 35 U.S.C. 154(b) by 1499 days.

(21) Appl. No.: 11/496,748

(22) Filed: Jul. 31, 2006

(65) Prior Publication Data

US 2007/0028714 A1 Feb. 8, 2007

Related U.S. Application Data

(60) Provisional application No. 60/704,068, filed on Jul. 29, 2005.

(51) Int. Cl.
*B25J 17/00* (2006.01)
(52) U.S. Cl. .................................. 74/490.08
(58) Field of Classification Search ............... 74/490.07, 74/490.08, 490.09, 490.01; 248/188.1, 678, 248/346.01; 310/309; 359/290, 291, 292, 359/295
See application file for complete search history.

(56) References Cited

U.S. PATENT DOCUMENTS

| | | | |
|---|---|---|---|
| 5,963,367 A * | 10/1999 | Aksyuk et al. | 359/392 |
| 6,196,081 B1 * | 3/2001 | Yau | 74/479.01 |
| 6,215,081 B1 | 4/2001 | Jensen et al. | |
| 6,504,643 B1 * | 1/2003 | Peeters et al. | 359/290 |
| 6,531,947 B1 * | 3/2003 | Weaver et al. | 337/139 |
| 6,556,318 B1 * | 4/2003 | Goldstein et al. | 398/9 |
| 6,675,671 B1 * | 1/2004 | Jokiel et al. | 74/490.09 |
| 6,679,055 B1 * | 1/2004 | Ellis | 60/527 |
| 6,734,598 B2 * | 5/2004 | Shibaike et al. | 310/309 |
| 6,806,991 B1 * | 10/2004 | Sarkar et al. | 359/290 |
| 7,509,886 B2 * | 3/2009 | Horin et al. | 74/490.05 |
| 2005/0286110 A1 * | 12/2005 | Wen et al. | 359/290 |

* cited by examiner

*Primary Examiner* — Thomas R Hannon
*Assistant Examiner* — Alan Waits
(74) *Attorney, Agent, or Firm* — Steven L. Nichols; Van Cott, Bagley, Cornwall & McCarthy P.C.

(57) ABSTRACT

A platform actuator includes a substrate, a first, a second, and a third spherical input slider-crank mechanism, wherein each of the first, second, and third spherical input slider crank mechanism is coupled by a first end to said substrate, and a platform is coupled to a second end of each of the first, second, and third spherical input slider-cranks. According to one exemplary embodiment, each of the first, second, and third spherical input slider-crank mechanisms are configured to convert in-plane motion to out-of-plane motion.

21 Claims, 13 Drawing Sheets

SPHERICAL THREE DEGREES OF FREEDOM PLATFORM

RELATED APPLICATION

The present application claims priority under 35 U.S.C. §119(e) of previous U.S. Provisional Patent Application No. 60/704,068, filed Jul. 29, 2005, entitled "Spherical three degrees of freedom platform," which application is incorporated herein by reference in its entirety.

TECHNICAL FIELD

The present systems and methods relate to spherical structures. More particularly, the present systems and methods relate to systems and methods for manufacturing spherical structures to be formed in a single plane, but that selectively move a platform in at least three degrees of freedom.

BACKGROUND

A number of current technologies incorporate the transmission, reflection, and manipulation of light. For example, fiber optic systems are used to transmit data at nearly the speed of light. Additionally, LCD televisions and other audio visual components use reflective arrays that selectively manipulate light in order to reproduce images.

A number of traditional switches are effective in manipulating and re-directing light rays by tilting a reflective substrate between two positions. However, it is often desired to modify not only the angle of reflection, but also the focal distance of the transmitted light. Modification of the focal distance requires not only axial tilting of the switching structure, but it also demands out of plane motion by the switching structure.

Further, there is a need for accurate, low power mechanisms for the out-of-plane positioning of microelectromechanical system (MEMS). Such mechanisms are useful in mirror arrays and in erectable structures.

SUMMARY

A platform actuator includes a substrate, a first, a second, and a third spherical input slider-crank mechanism, wherein each of the first, second, and third spherical input slider crank mechanism is coupled by a first end to said substrate, and a platform is coupled to a second end of each of the first, second, and third spherical input slider-cranks. According to one exemplary embodiment, each of the first, second, and third spherical input slider-crank mechanisms are configured to convert in-plane motion to out-of-plane motion.

According to another exemplary embodiment, a microelectromechanical system (MEMS) includes a substrate, a reflective surface coupled to the substrate, a first, a second, and a third spherical input slider-crank mechanism, wherein each of said first, second, and third spherical input slider-crank mechanism includes a first end and a second end, a fixed hinge disposed on the first end, a slider crank body coupled to the fixed hinge, an input slider disposed on the slider crank body opposite the fixed hinge, and a release hinge disposed in the slider crank body between the fixed hinge and the slider crank body, wherein each of the first, second, and third spherical input slider crank mechanism is coupled by a first end to the substrate. According to this exemplary embodiment, a platform is slideably coupled to a second end of each of the first, second, and third spherical input slider-crank.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

The present exemplary systems and methods provide for low power mechanism configured to produce selective out-of-plane positioning. In particular, an exemplary out-of-plane positioning microelectromechanical system (MEMS) may include at least a first, a second, and a third spherical input slider-crank mechanism coupled to a platform, wherein each of the first, second and third spherical input slider-crank mechanisms are configured to convert in-plane motion to out-of-plane motion. Additionally, according to one exemplary embodiment, each of the at least first, second, and third spherical slider-crank mechanisms may be independently actuated to provide for selective tilt operability of the coupled platform. Further details of the present exemplary systems and methods will be described in further detail below.

The present descriptions and exemplary systems are described in terms of an exemplary microelectromechanical system (MEMS) to detail the formation and structure of the system, and for ease of explanation. However, describing the present exemplary systems and methods in terms of a MEMS structure in no way limits the scope of the claims to only a MEMS structure. Rather, the present exemplary systems and methods may similarly be applied to macro systems.

As used in the present specification, and in the appended claims, the term "compliant mechanism" is meant to be understood as a device in which one or more integrally formed flexural members provide motion through deflection.

As used herein, the term "spherical mechanisms" shall be interpreted as including linkages that have the property that every link in the system rotates about the same fixed point. A common method for visualizing the motion of spherical mechanisms is by representing the links in a spherical mechanism as arcs inscribed on a unit sphere. Any two links in a spherical mechanism are joined with a pin (or revolute) joint which permits rotation about an axis in space that passes through the fixed point. In a spherical bi-stable mechanism, the fixed point may be either of the bi-stable compliant component's two pin joints.

In the following description, for purposes of explanation, numerous specific details are set forth in order to provide a thorough understanding of the present systems and methods for producing a low power mechanism configured to produce out-of-plane positioning. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
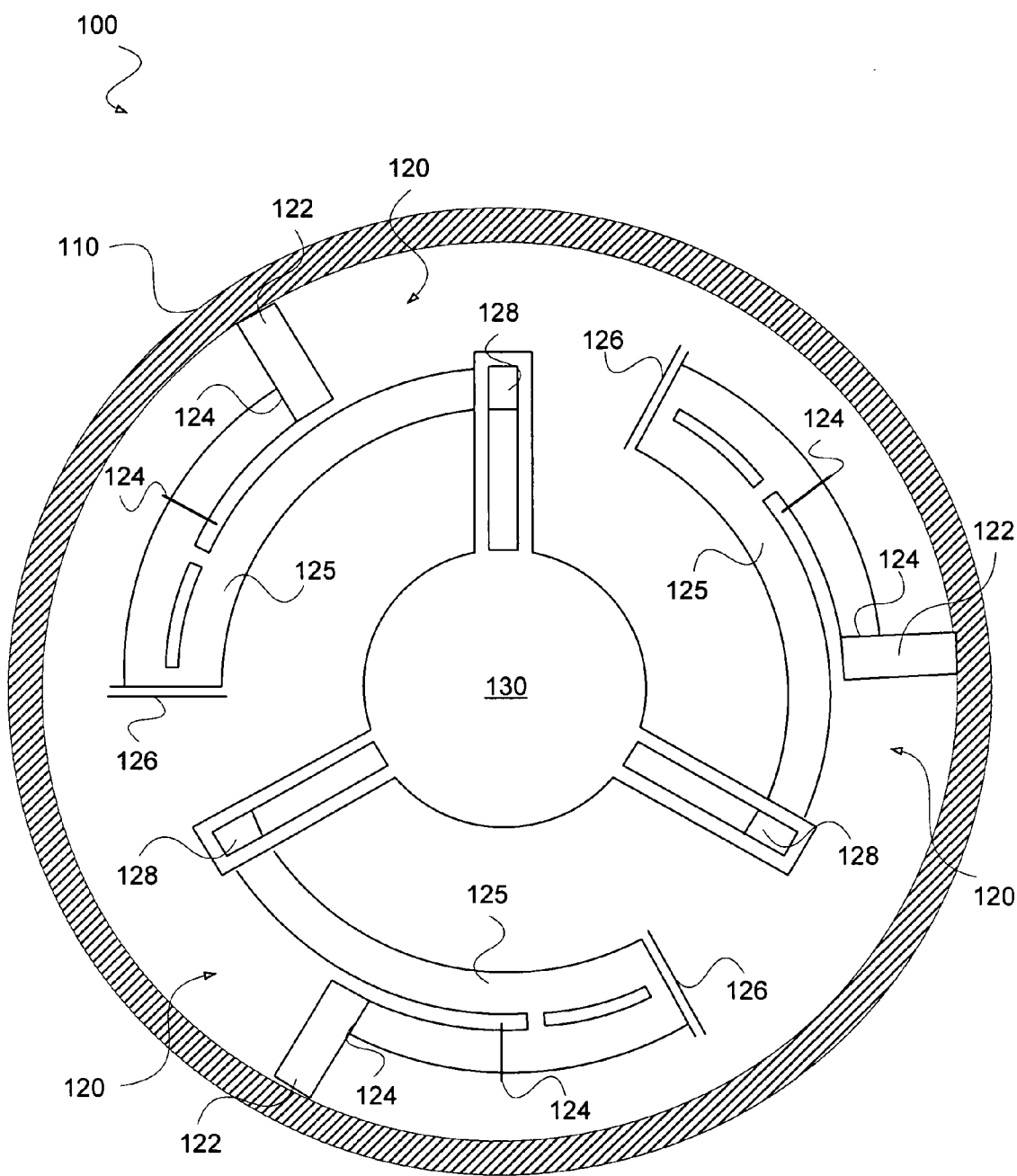
FIG. 1 is a top view of a spherical three degree of freedom platform, according to one exemplary embodiment.

FIG. 1 illustrates a spherical mechanism, referred to herein as a micro helico-kinematic platform (MHKP) (100), configured to produce out-of-plane positioning, according to one exemplary embodiment. As illustrated, the MHKP (100) includes three substantially similar spherical slider-cranks (120) with the same center. Each of the spherical slider-cranks (120) include an input slider (122), a plurality of hinges (124) including a fixed hinge (126) coupled to a substrate, a slider-crank body (125), and a connection joint (128) to a platform (130). According to one exemplary embodiment, the platform (130) rests over the connection joint (128). Additionally, as shown in FIG. 1, an input mechanism (110) may be coupled to one or more of the input sliders (122). Further details of the operation of the exemplary MHKP (100) will be provided below.

Figure 2:
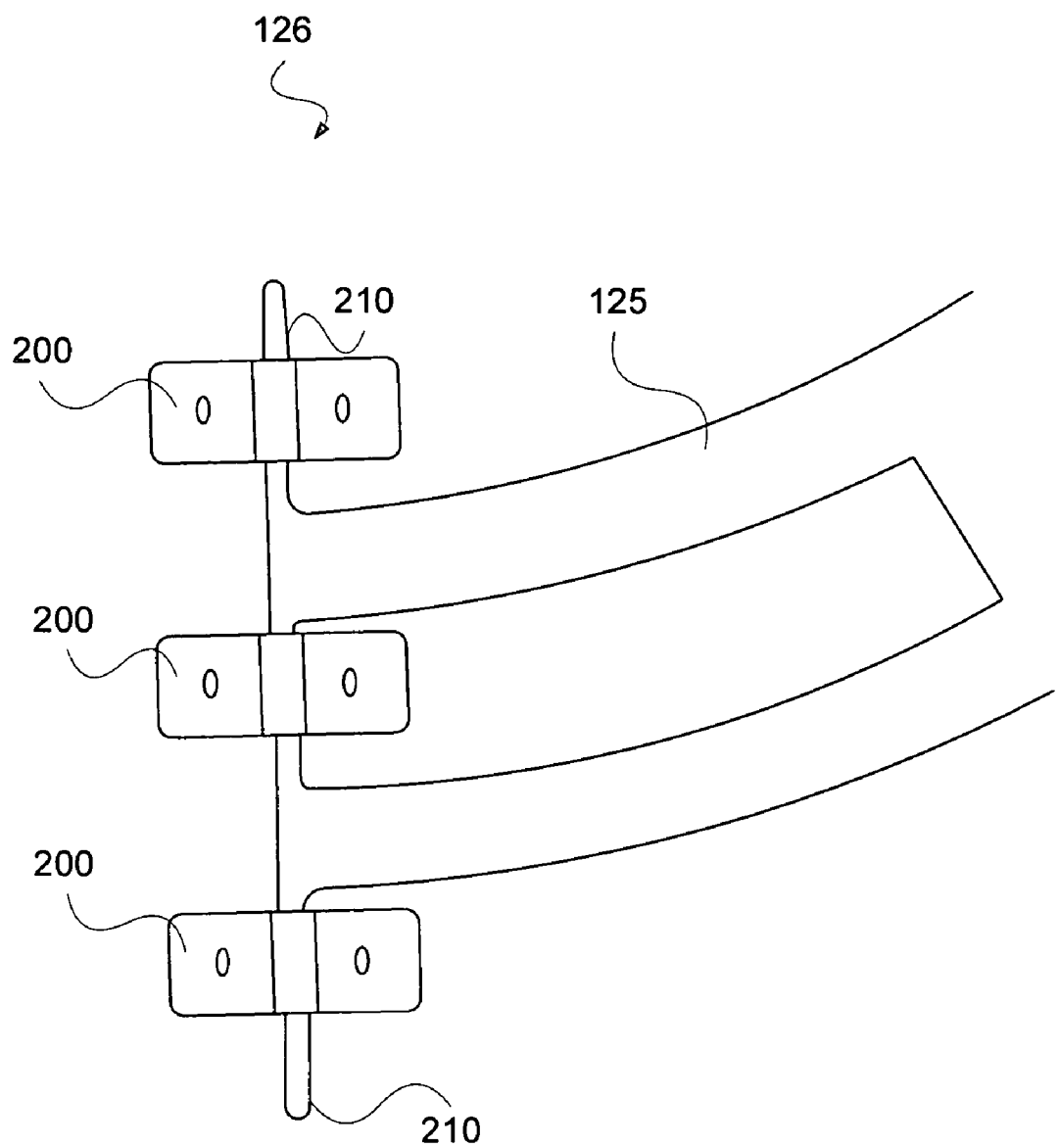
FIG. 2 is a top view of a hinge joint, according to one exemplary embodiment.

As mentioned above, the present exemplary MHKP (100) includes three substantially similar spherical slider-cranks (120) having the same center, according to one exemplary embodiment. Further, each spherical slider-crank (120) is coupled to a substrate (not shown) by a fixed hinge (126) disposed on one end of the spherical slider-cranks. FIG. 2 further illustrates a fixed hinge that may be used to couple the spherical slider-crank (120) to the substrate, according to one exemplary embodiment. As shown in FIG. 2, one end of the slider-crank body (125) includes a plurality of protrusions (210) extending substantially perpendicular to the main slider-crank body. As illustrated, a retention member (200) may be formed over the protrusion (210) fixedly coupling the slider-crank body (125) to the substrate. However, as shown, the retention members (200) may include a hemispherical cut out or bend to facilitate rotation of the protrusion (210).

Figure 3:
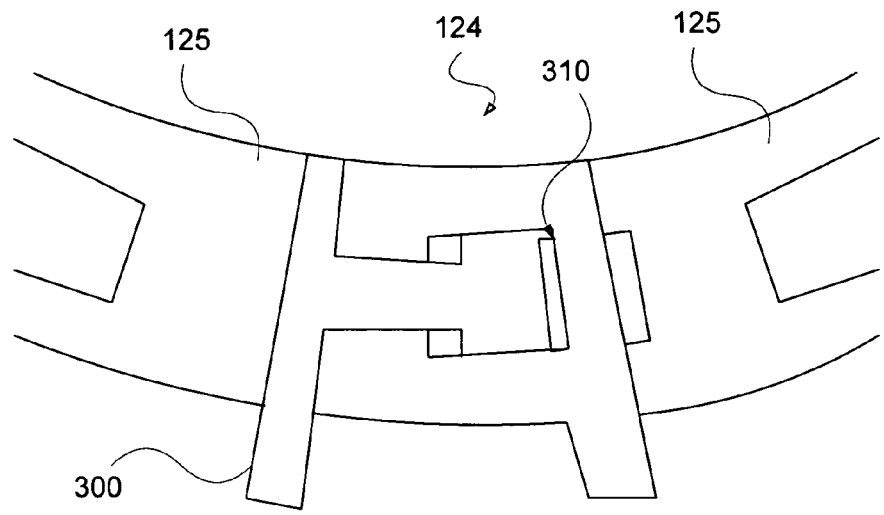
FIG. 3 is a top view of a release hinge in its fabricated position, according to one exemplary embodiment.
Figure 4:
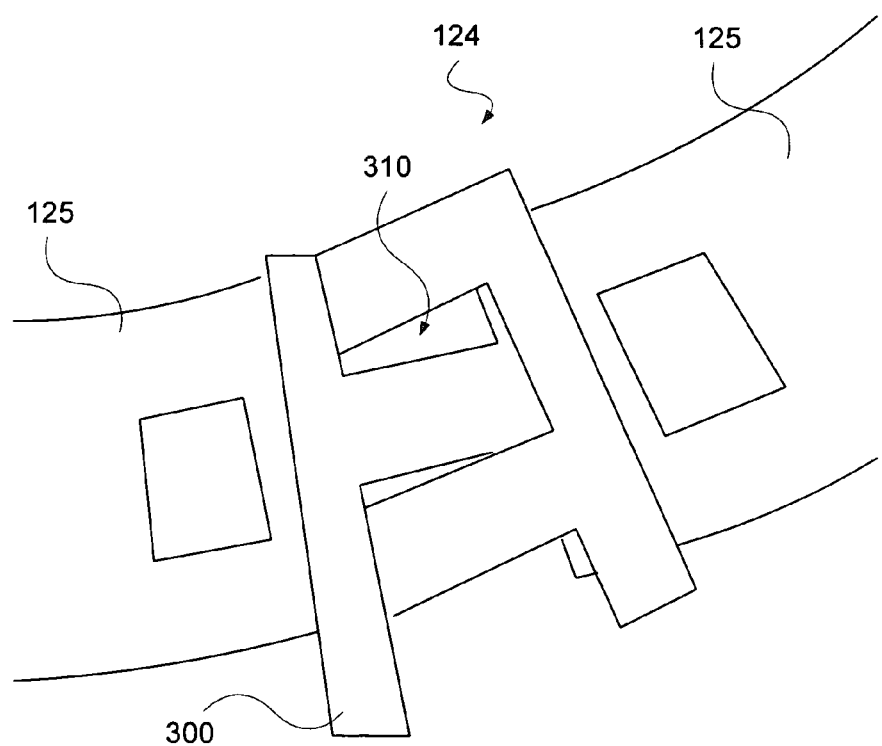
FIG. 4 is a top view of a release hinge in an out-of-plane configuration, according to one exemplary embodiment.

In addition to the fixed hinge (126), a number of non-fixed hinges (124) are also formed in the slider-crank body (125) of the spherical slider-crank (120). FIGS. 3 and 4 illustrate a release hinge, in a fabricated and an out-of-plane configuration, respectively, that may be used as a non-fixed hinge (124) in the present exemplary spherical slider-crank (120). As shown, the release hinge may be formed in the slider-crank body (125) to facilitate bending of the slider-crank body during operation. According to one exemplary embodiment illustrated in FIG. 3, the release hinge may include, but is in no way limited to, a male retention member (300) formed on an end of a first section of the slider-crank body (124) and a female orifice (310) formed on an end of a second section of the slider-crank body. As shown, the release hinge may be fabricated such that the male retention member is positioned through the female orifice (300), assuring retention of the first and second sections of the slider-crank body (124).

As illustrated in FIG. 4, when actuated, the male retention member (300) may be drawn towards the female orifice (310) until the male member interferes with the walls of the female orifice. As shown in FIG. 4, the male member (300) is sized to prevent a release of the male retention member (300) through the female orifice.

While the plurality of hinges (124) including a fixed hinge (126) have been described herein and illustrated in the accompanying figures as having a particular form, any number of hinge configurations may be used in the present exemplary system. For example, any hinge that may be coupled to the substrate may function as the fixed hinge (126). Further, a torsion hinge or other compliant member may be used in the place of a hinge to provide a desired rotation.

Figure 5:
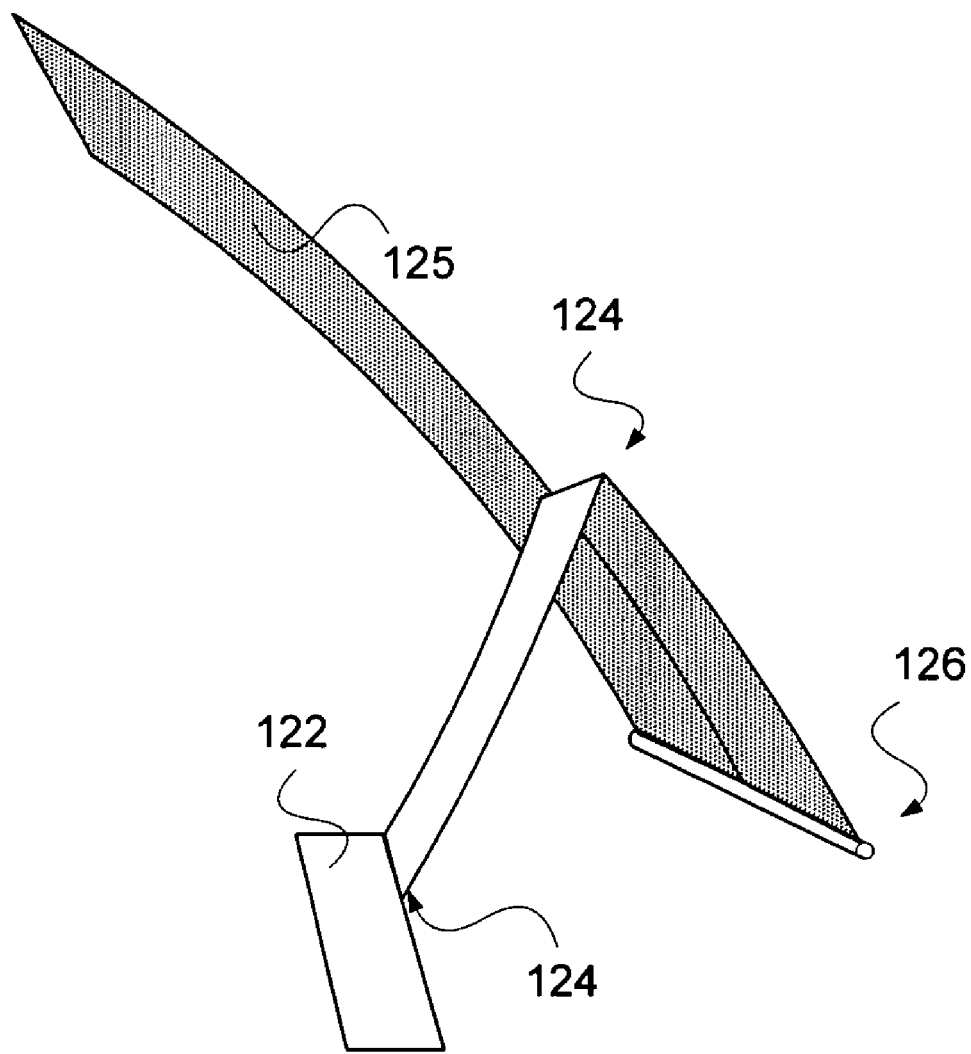
FIG. 5 is a perspective side view of a displaced spherical slider-crank micromechanism, according to one exemplary embodiment.

Returning again to FIG. 1, actuation of the similar spherical slider-cranks (120) may be performed by a rotation of the input member (110), such as a slider ring. According to one exemplary embodiment, rotation of the input member (110) induces simultaneous rotation of each of the input sliders (122) of the similar spherical slider-cranks (120). FIG. 5 illustrates the operation of each spherical slider-crank (120) as the input sliders (122) are rotated.

As shown in FIG. 5, rotation of the input sliders (122) draws each input slider closer to its associated fixed hinge (126). As the input sliders (122) are manipulated closer to the fixed hinge (126), the hinges (124) rotate to allow for the out of plane orientation of the slider-crank body (125). As shown in FIG. 4, the out of plane orientation of the slider-crank body (125) includes upward translation and slight rotation.

Figure 6:
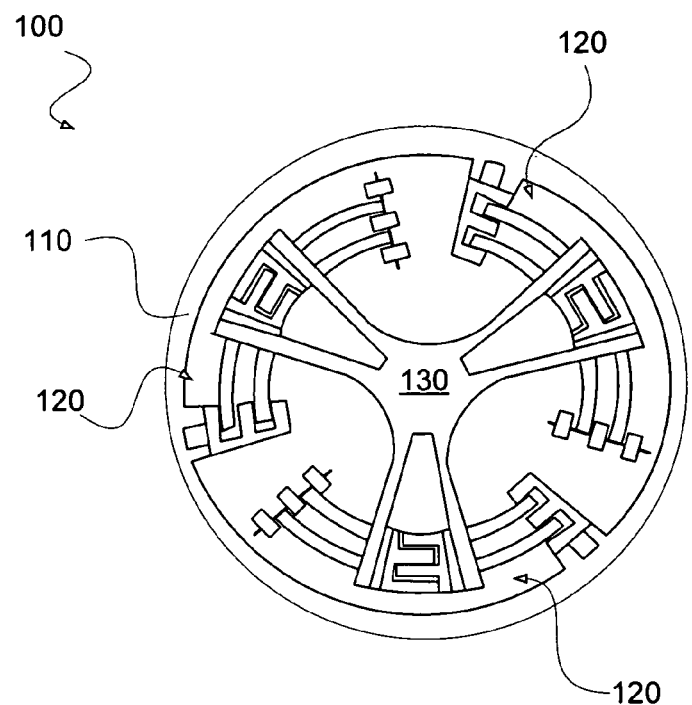
FIG. 6 is a top view of a spherical three degree of freedom platform in an original fabrication position, according to one exemplary embodiment.
Figure 7:
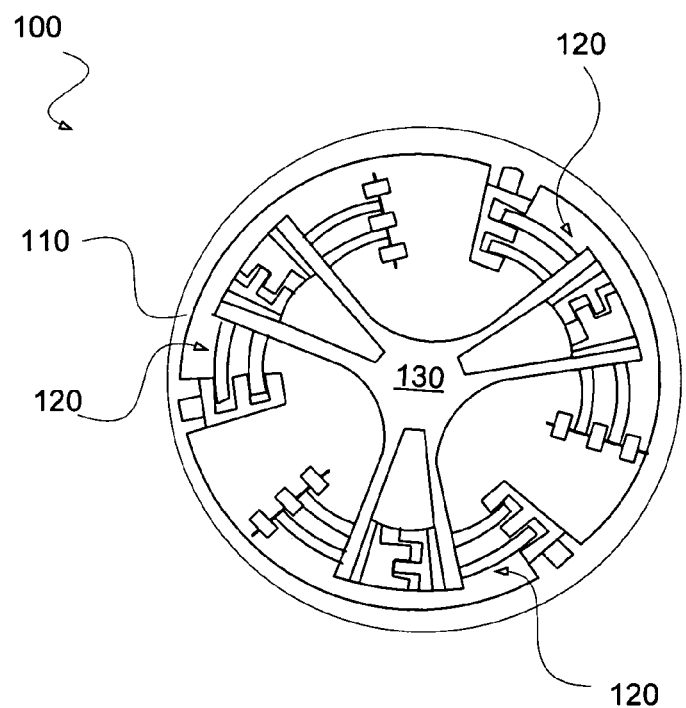
FIG. 7 is a top view of a spherical three degree of freedom platform in an actuated position, according to one exemplary embodiment.

FIGS. 6 and 7 illustrate top views of an MHKP (100) in an original fabrication position and an actuated position, respectively. According to the present exemplary embodiment, one advantage present exemplary MHKP (100) is that relatively large vertical translation is achieved without any side-to-side translation. The elimination of side-to-side motion allows the present exemplary MHKP (100) to be tightly arrayed with other MHKP devices (100) since motion interference will not occur.

Figure 8:
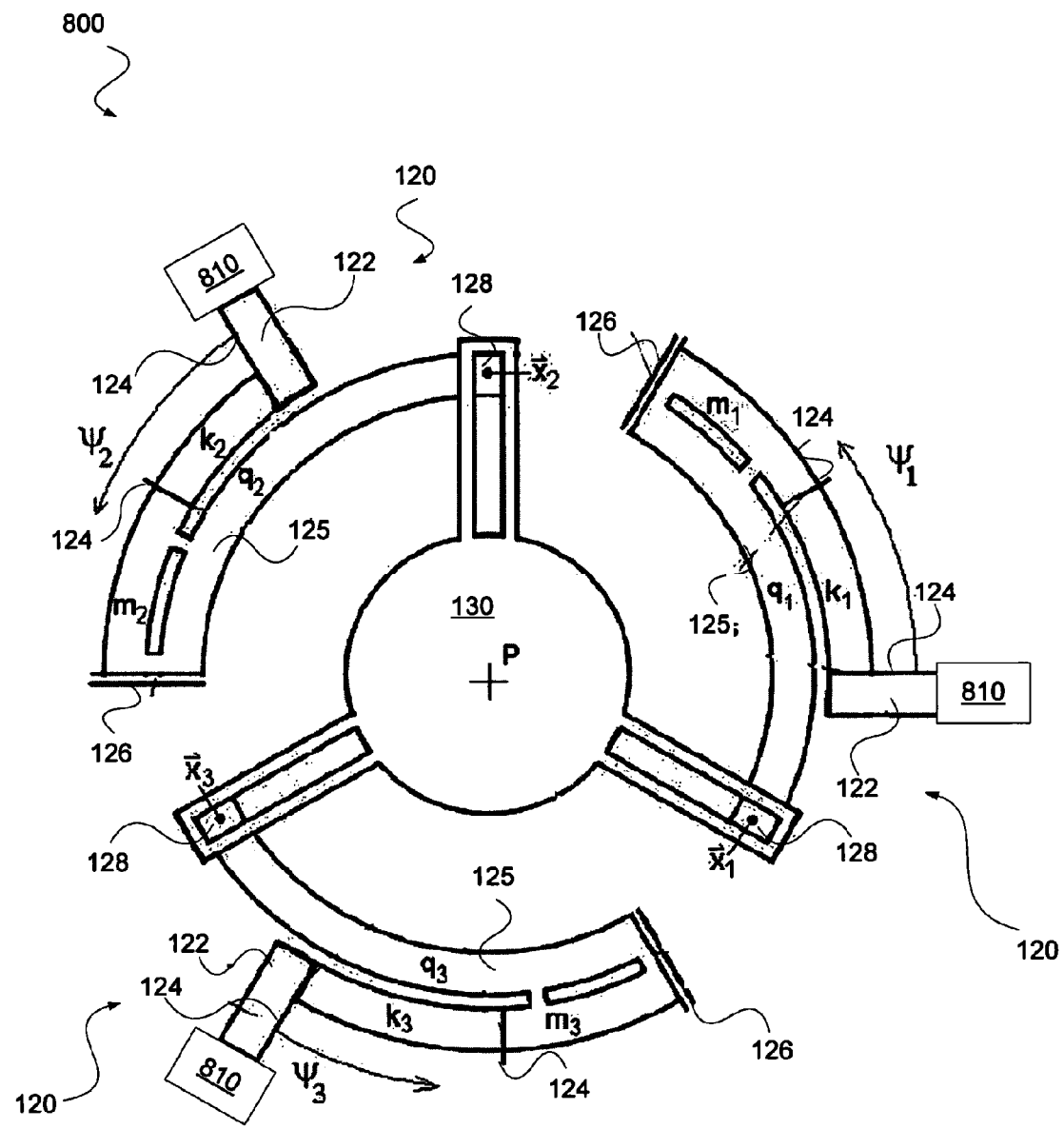
FIG. 8 is a top view of a spherical three degree of freedom platform, according to one exemplary embodiment.

While the present exemplary MHKP (100) system has been described herein as having a single actuating input member (110) configured to simultaneously actuate each input slider (122), additional degrees of freedom for the platform (130) may be achieved by decoupling the input sliders. As used herein, the MHKP (100) having the input sliders (122) independently actuated will be referred to as the three-degree-of-freedom platform (3DOFP). FIG. 8 illustrates a schematic diagram of the 3DOFP (800) in its fabricated position, according to one exemplary embodiment. As illustrated, the 3DOFP (800) includes many of the components of the MHKP (100) such as three substantially similar spherical slider-cranks (120) with the same center, each spherical slider-crank (120) including an input slider (122), a plurality of hinges (124) including a fixed hinge (126) coupled to a substrate, a slider-crank body (125), and a connection joint (128) to a platform (130). However, in contrast to the MHKP (100) described above, the 3DOFP (800) includes an independent actuator (810) for each spherical slider-crank (120), thereby providing the ability for the platform (130) to achieve three degrees of freedom. The three degrees of freedom are manifested in three input parameters, i.e. the rotation of three different spherical slider-cranks (120), and three output parameters, i.e. the height of the platform (130), and magnitude and direction of the platform tilt. The ability of the platform (130) to tilt away from the horizontal allows the 3DOFP (800) system to be well suited for use as an orientable mirror in 3-D optics applications.

As described in detail below, the 3DOFP (800) can be analyzed by considering each spherical slider-crank (120) independently, and then analyzing their combined effect on the position and orientation of the platform (130). Each spherical slider-crank (120) includes a rotational slider, a coupler link, $k_i$, and a output link, $m_i$. Each output link is attached to the substrate and has an output extension link, $q_i$, attached to it. At the end of each output extension link is an output point $\vec{x}_i$, that is constrained to move inside of a slot in the platform (130). Each spherical slider-crank (120) is analyzed independently to determine the location of $x_i$ and then the $x_i$ can be used to determine the location of the platform center P and the orientation of a normal vector $\vec{np}$ to the platform (130).

Figure 9:
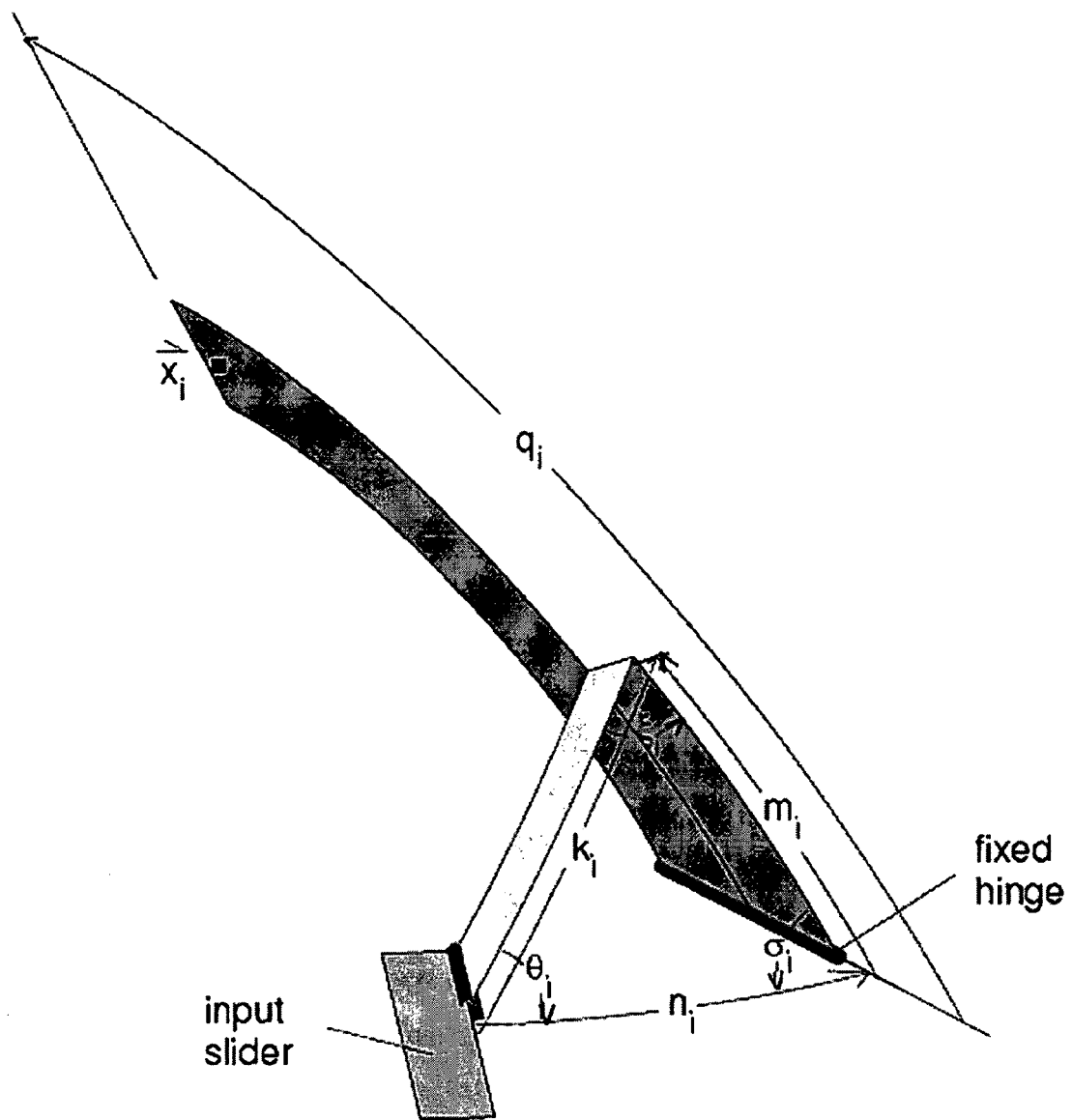
FIG. 9 is a perspective view of a spherical slider-crank, according to one exemplary embodiment.

The 3DOFP (800) has three rotational inputs, $\psi_1$, $\psi_2$, and $\psi_3$. The value of an input rotation, $\psi_i$, can be used to determine the orientations of the links in the $i^{th}$ spherical slider-crank (120) and the location of an output point $\vec{x}_i$ as shown in FIG. 9.

The input, $\psi_i$, controls the arclength of one side, $n_i$, of a spherical triangle. In the fabricated position, the length of the controlled side, $n_{i0}$, is equal to the sum of the lengths of the other two sides of the spherical triangle, $m_i$, and $k_i$, or $$n_{i0}=m_i+k_i \quad \text{Equation 1}$$

The length of the control side, $n_i$, can be expressed as a function of the input rotation as $$n_i=n_{i0}-\psi_i \quad \text{Equation 2}$$

The dihedral angles, $\sigma_i$, $\xi_i$, and $\theta_i$, formed by the sides of the spherical triangle may then be calculated from the spherical law of cosines as $$\sigma_i = \cos^{-1}\left(\frac{\cos(m_i)-\cos(k_i)\cos(n_i)}{\sin(k_i)\sin(n_i)}\right) \quad \text{Equation 3}$$

$$\theta_i = \cos^{-1}\left(\frac{\cos(k_i)-\cos(m_i)\cos(n_i)}{\sin(m_i)\sin(n_i)}\right) \quad \text{Equation 4}$$

$$\xi_i = \cos^{-1}\left(\frac{\cos(n_i)-\cos(k_i)\cos(m_i)}{\sin(k_i)\sin(m_i)}\right) \quad \text{Equation 5}$$

where $\sigma_i$ is the output angle (link $m_i$ is attached to the ground), $\theta_i$ is the coupler angle (link $k_i$ is the coupler link), and $\xi_i$ is the transmission angle that determines the aptness of the force transmission from link $k_i$ to $m_i$.

Figure 10:
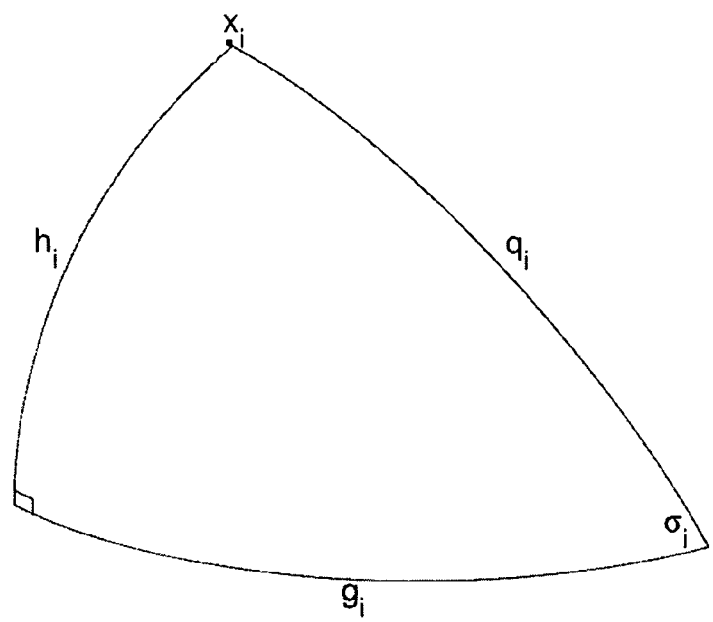
FIG. 10 is a right spherical triangle for identifying the location of a coupling link, according to one exemplary embodiment.

Continuing with FIG. 9, the output extension arm, $q_i$, is attached to the output link. The position of the coupler point, $\vec{x}_i$, on the tip of the coupler arm is given by using Napier's rules to solve the right spherical triangle formed by $q_i$ at the angle $\sigma$ with the substrate as shown in FIG. 10. The adjacent side of the right spherical triangle, $g_i$, and the opposite side, $h_i$, are convenient for expressing the position of $\vec{x}_i$ in spherical coordinates. The adjacent side $g_i$ is the azimuthal angle of the output point with respect to the fixed corner of the spherical triangle, and the opposite side hi is the elevation angle of the output point with respect to the substrate.

$$\tan(g_i)=\tan(q_i)\cos(\sigma_i) \quad \text{Equation 6}$$

$$\sin(h_i)=\sin(q_i)\sin(\sigma_i) \quad \text{Equation 7}$$

The location of the output point, $\vec{x}_i$, can then be expressed in terms of the components $x_{ix}$, $x_{iy}$, and $x_{iz}$.

$$x_{ix}=\cos(h_i)\cos(g_i+\phi_i) \quad \text{Equation 8}$$

$$x_{iy}=\cos(h_i)\cos(g_i+\phi_i) \quad \text{Equation 9}$$

$$x_{iz}=\sin(h_i) \quad \text{Equation 10}$$

where $\phi_1=0°$, $\phi_2=120°$, and $\phi_3=240°$

Once the coordinates of all three $x_i$ are known, the position of the center of the platform P (130) and the orientation of the normal to the platform $\vec{np}$ can be found.

Figure 11:
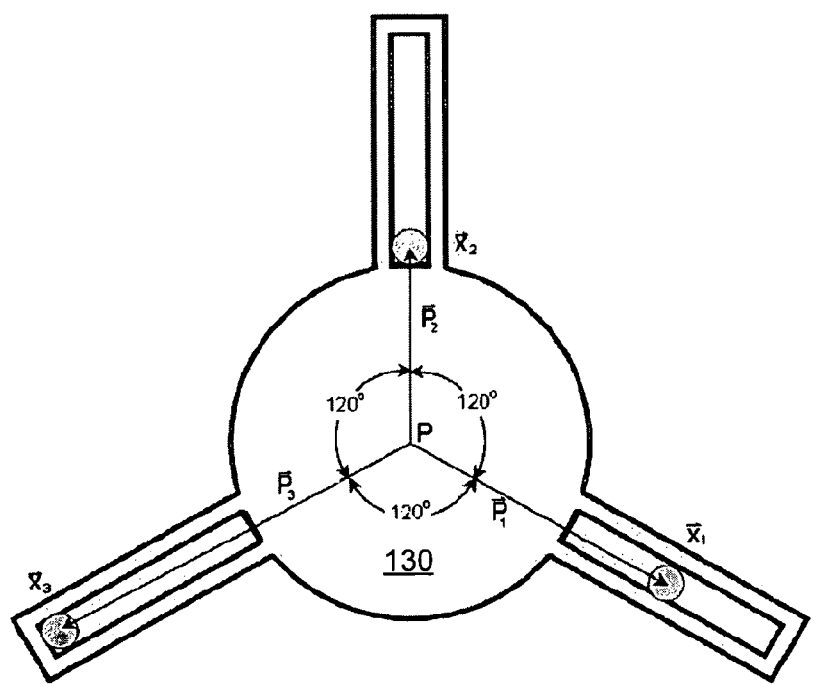
FIG. 11 illustrates a top view of a platform used in the present spherical three degrees of freedom platform, according to one exemplary embodiment.

The coupler point $x_i$ is constrained to travel in a slot in the platform (130). The three slots in the platform (130) are straight lines that are radially arrayed around the center of the platform, P, with 120° between them as shown in FIG. 11.

Figure 12:
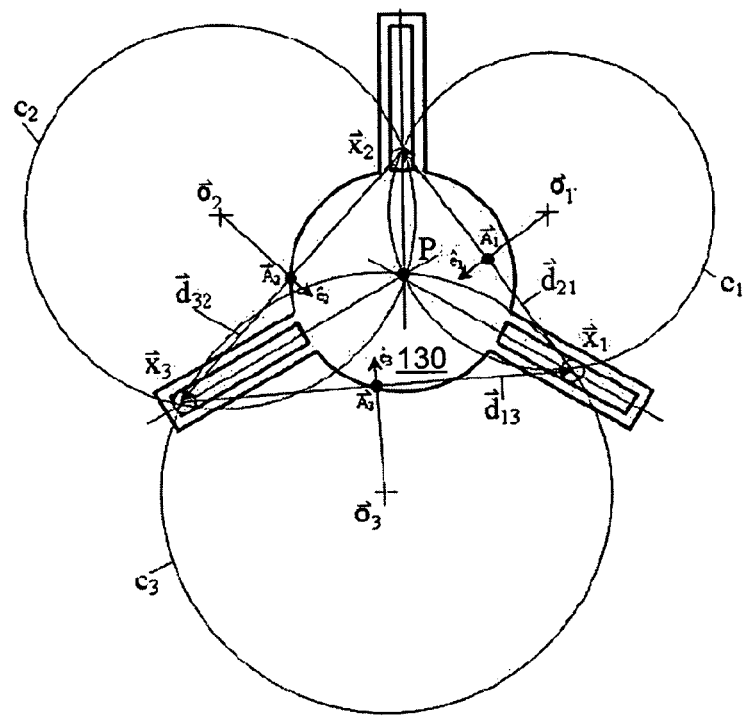
FIG. 12 is a top view illustrating a number of geometric relationships between elements of the platform of FIG. 11, according to one exemplary embodiment.
Figure 13:
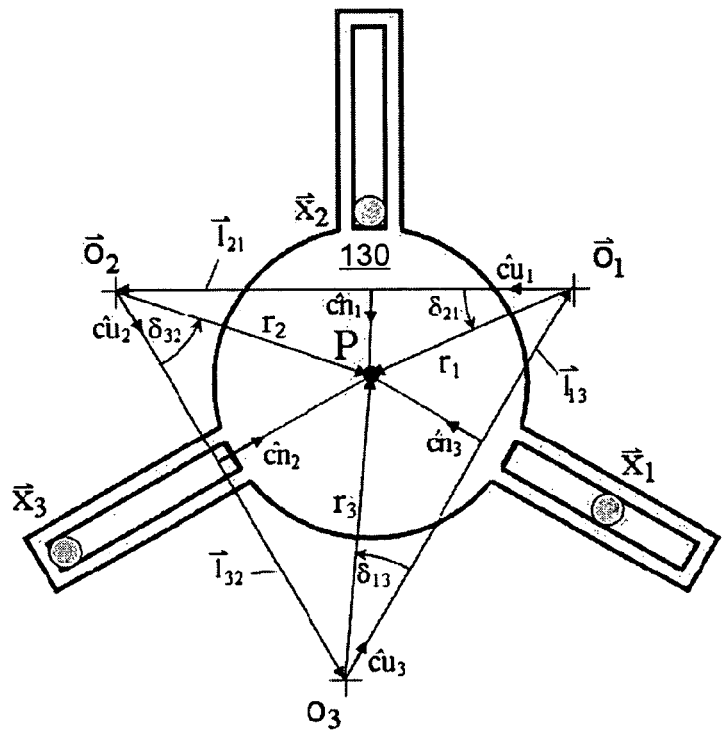
FIG. 13 is a top view illustrating a number of geometric relationships between elements of the platform of FIG. 11, according to one exemplary embodiment.

As an input angle, $\psi_i$, increases, the corresponding output point, $x_i$, tends to move closer to the center of the platform P. The position of P relative to the output points, $x_i$, can be solved in closed form using the geometric relationships illustrated in FIGS. 12 and 13, which are based on the lines $\vec{P}_i$ which connect point P with the points $x_i$ at 120° angles to each other.

The locus of points that can form a 120° angle with the points $x_1$ and $x_2$ lies on a circle, $c_1$, that contains the point P. Similarly, the pairs $\{x_2,x_3\}$ and $\{x_3,x_1\}$ and the angle constraint define circles, $c_2$ and $c_3$, that contain the point P. These circles all intersect at a single common point, which is the point P that is sought.

The equation for a particular circle (i.e. a circle in bipolar form) that forms an angle $\beta$ with two points $\{-a,0\}$ and $\{a,0\}$ is given by $$x^2+(y-a\cot(\beta))^2=a^2\csc^2(\beta) \quad \text{Equation 11}$$

where x-y coordinate frame is located at the midpoint of the segment between the two points. The x coordinate is parallel to the line segment that joins the two points and the y coordinate is perpendicular to that segment. The circle described by equation 11 has its center at a distance a cot($\beta$) away from the midpoint of the two reference points along a line perpendicular to the segment connecting the reference points. The circle has a radius given by a csc($\beta$).

The circles, $c_i$, are located in the same plane as the platform, which is determined by the three points $\vec{x}_i$. Thus, the circles and the platform have the same normal vector. The unit normal to the platform, $\vec{np}$ is determined by the cross product $$\hat{np} = \frac{\vec{d_{21}} \times \vec{d_{32}}}{|\vec{d_{21}} \times \vec{d_{32}}|} \qquad \text{Equation 12}$$

where $\vec{d_{21}}=\vec{x_2}-\vec{x_1}$ and $\vec{d_{32}}=\vec{x_3}-\vec{x_2}$ are two of the sides of the triangle formed by the points $x_1$, $x_2$ and $x_3$. The third side is given by $\vec{d_{13}}=\vec{x_1}-\vec{x_3}$. The location of the center of the circle $c_i$ is given by $$\vec{o_i} = \vec{A_i} + \frac{|\vec{d_{ji}}|}{2}\cot(120°)\hat{e}_i \qquad \text{Equation 13}$$

where $\vec{o_i}$ is the coordinate for the center of the circle $c_i$, $\vec{A_i}$ is the midpoint of the segment between $\vec{x_i}$ and $\vec{x_{i+1}}$ and $\hat{e}_i$ is a unit vector in a direction perpendicular to $\vec{np}$ and the triangle side $\vec{d_{ji}}$ (where j=i+1 for i=1; 2 and j=1 for i=3) or $$\hat{e}_i = \frac{\hat{np} \times \vec{d_{ji}}}{|\hat{np} \times \vec{d_{ji}}|} \qquad \text{Equation 14}$$

The radii, $r_i$, of the circles $c_i$ are given by $$r_i = \frac{|\vec{d_{ji}}|}{2}\csc(120°) \qquad \text{Equation 15}$$

The point, P, lies at the intersection of the three circles, $c_i$. In general, two non-concentric circles intersect at two points. One of the intersection points is an $x_i$ point and the other is the point P. Since the point P is in the interior of the triangle there is not any ambiguity about which of the intersection points is the point P. The points $o_i$, $o_j$ and P form a triangle with sides $l_{ji}$, $r_i$, and $r_j$. Thus, using the law of cosines the angle $\delta_{ji}$ that $r_i$ makes with $l_{ji}$ can be found as $$\delta_{ji} = \cos^{-1}\left(\frac{|\vec{l_{ji}}|^2 + r_i^2 - r_j^2}{2|\vec{l_{ji}}|r_i}\right) \qquad \text{Equation 16}$$

The calculation of $\delta_{ji}$ allows the position of P to be found as $$\vec{P_{ji}} = \vec{o_i} + r_i\cos(\delta_{ji})\vec{cu_i} + r_i\sin(\delta_{ji})\vec{cn_i} \qquad \text{Equation 17}$$

where $\vec{cu_i}$ is a unit vector parallel with the segment from $o_i$ to $o_j$, and $\vec{cn_i}$ is a unit vector perpendicular to $\vec{cu_i}$ and $\vec{np}$. Equations for $\vec{cu_i}$ and $\vec{cn_i}$ are given by $$\hat{cu}_i = \frac{\vec{l_{ji}}}{|\vec{l_{ji}}|} \qquad \text{Equation 18}$$

$$\hat{cn}_i = \hat{np} \times \hat{cu}_i \qquad \text{Equation 19}$$

There are three different $\vec{p_{ji}}$, that can be calculated for each set of $\vec{x_i}$ and each gives the correct location of the point $\vec{p}$. The redundancy of the solution method provides a check on the correctness of the calculations. The length $\vec{p_i}$ is important because the platform slots do not extend to the center of the platform. Thus, the platform slots act as stops on the motion of the input sliders which results in a minimum permissible value for $p_i$.

EXAMPLE

The model described above was used to predict the motion of a 3DOFP (800) with $m_i=k_i=30°$, $q_i=90°$ and a slot constraint that prevents $p_i \leq \frac{1}{3}p_{iO}$, where $p_{iO}$ is the value of $p_i$ as fabricated.

Figure 14:
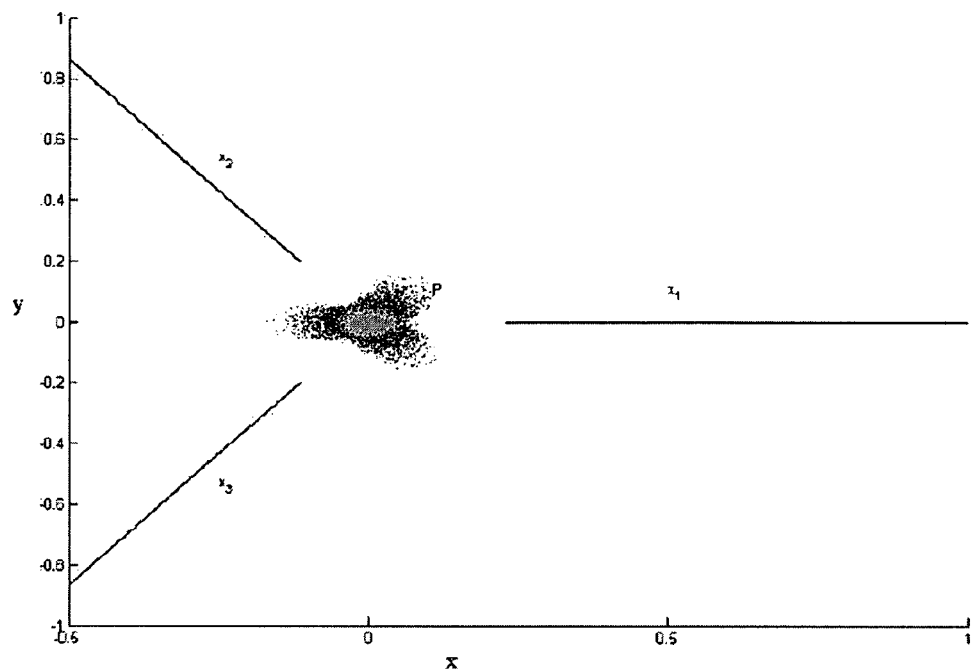
FIG. 14 is a chart illustrating a top view of a random sampling of the locus of points that can be reached by the center of the platform in a spherical three degrees of freedom platform configuration, according to one exemplary embodiment.
Figure 15:
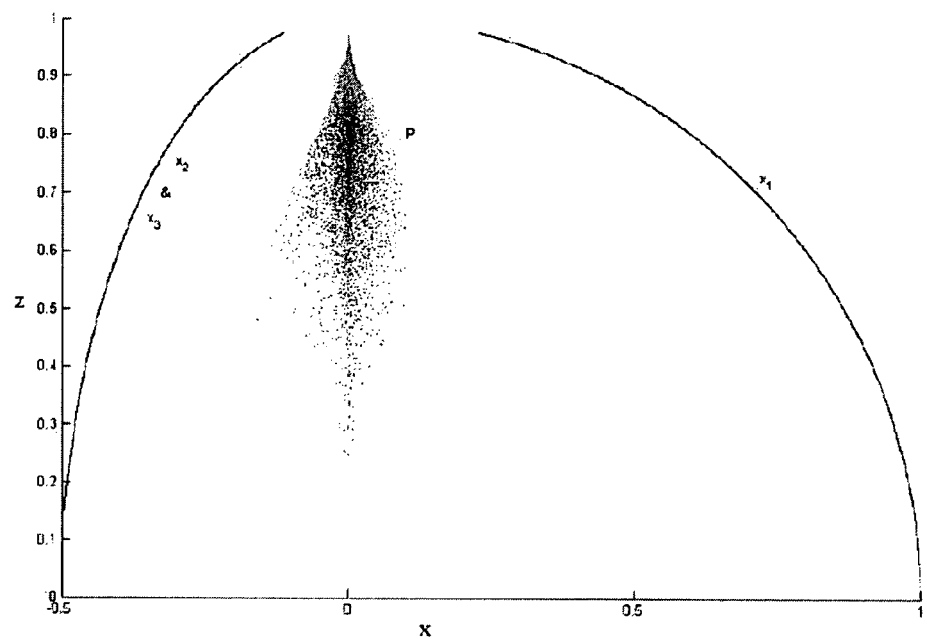
FIG. 15 is a chart illustrating a side view of a random sampling of the locus of points that can be reached by the center of the platform in a spherical three degrees of freedom platform configuration, according to one exemplary embodiment.

FIG. 14 shows a top view and FIG. 15 shows a side view of a random sampling of the locus of points that can be reached by the center of the platform, P, and the $\vec{x_i}$. To illustrate the limitations placed by the slot geometry, the platform locations that require $p_i \leq \frac{1}{3}p_{iO}$ are colored gray. In the top view (FIG. 14), the circular arcs traced by the $x_i$ appear to be straight lines. In the side view (FIG. 15), the curved paths of the $x_i$ are evident. In FIG. 14, the locus of points that can be occupied by P has three distinct lobes, which are positioned 180° away from the arcs formed by the $x_i$. This indicates that as a slider-crank is actuated, it tends to move the platform's center away from the slider-crank. The side view shows that the greatest range of motion in the x-y plane occurs at mid-range displacements in the z direction.

Figure 16:
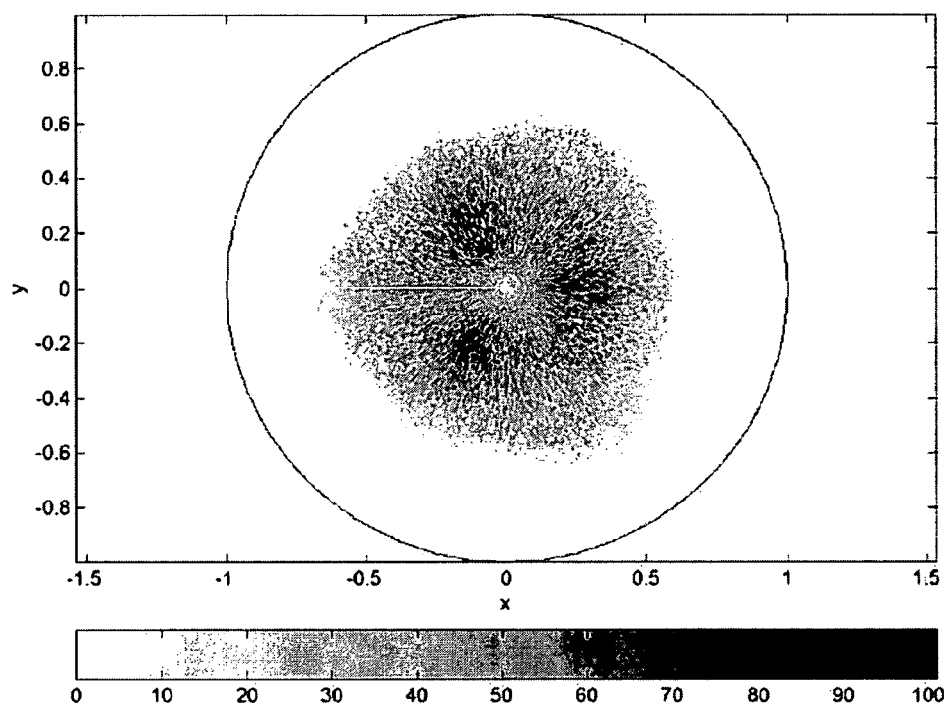
FIG. 16 shows a top view of a unit hemisphere wherein points on the hemisphere represent the different orientations for the platform unit normal, according to one exemplary embodiment.

FIG. 16 shows a top view of a unit hemisphere. Points on the hemisphere represent the different orientations for the platform unit normal. The points on the hemisphere are colored in accordance with the relative frequency of platform normal assuming within one degree of a particular orientation given a large random sampling of the input values, $\psi_i$. Darker colored areas indicate more frequent occurrence of a particular orientation. As a result of the three different input directions there is a slight bias towards tilting in the direction inline with the path of an output point.

Figure 17:
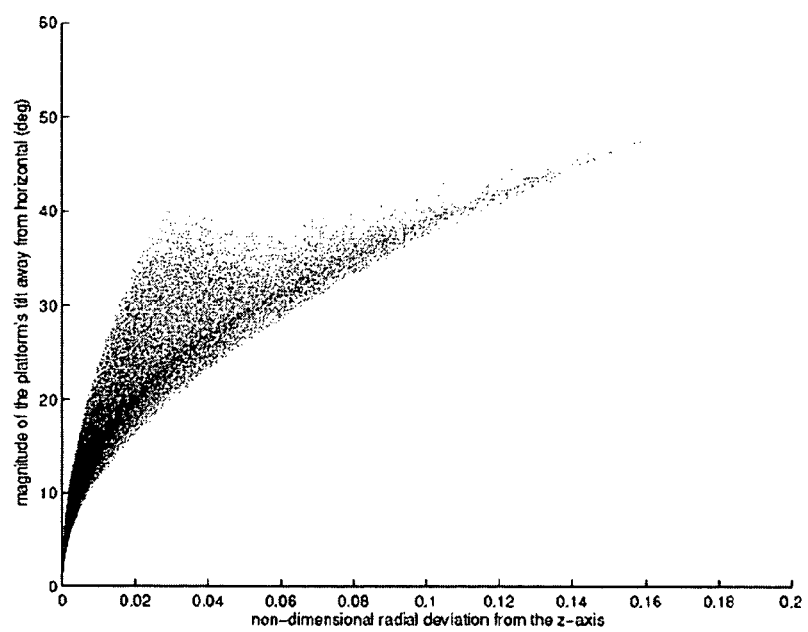
FIG. 17 is a chart plotting the radial distance from the z-axis versus the tilt of the platform from the horizontal of a spherical three degrees of freedom platform configuration, according to one exemplary embodiment.

FIG. 17 plots the radial distance from the z-axis versus the tilt of the platform from the horizontal. The two quantities are strongly and nonlinearly correlated. Thus, tilting the platform cannot be achieved without some movement of the platform center away from the z-axis, and in general the more tilt required, the larger the required movement away from the z-axis.

Figure 18:
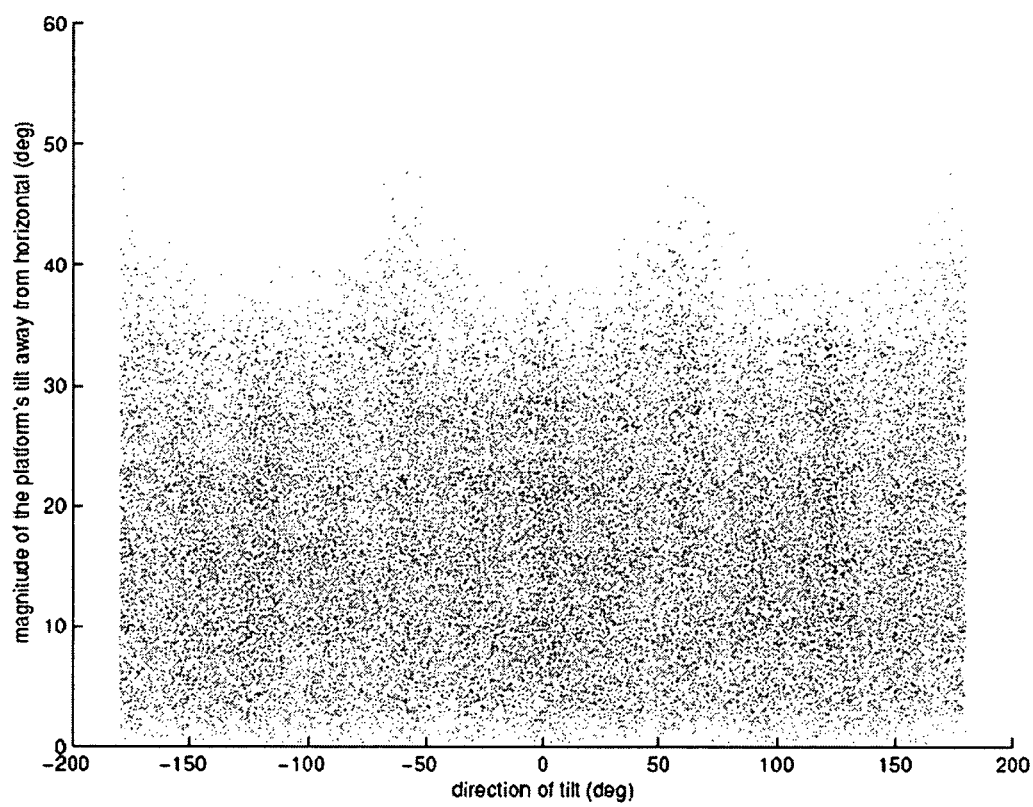
FIG. 18 is a chart illustrating the magnitude of the platform tilt versus the direction of tilt for randomly distributed input values, according to one exemplary embodiment.

FIG. 18 shows the magnitude of the platform tilt versus the direction of tilt for randomly distributed input values. The platform can achieve a tilt magnitude of approximately 40° in any direction and up to 50° in preferred directions corresponding to the paths of the output points $x_i$.

According to one exemplary embodiment, a bistable device, such as a Young Mechanism, can be attached to each of the input spherical slider-cranks (120) of the 3DOFP (800) in a manner similar to that described in U.S. patent application Ser. No. 11/496,747, titled "Spherical Bistable Mechanism," filed Jul. 31, 2006, and U.S. Pat. No. 6,215,081, titled "Bistable Compliant Mechanism" which references are incorporated herein by reference in their entireties. The resulting mechanism has a multistable platform (130) with two-stable positions for each input slider (120), yielding a total of eight stable positions for the platform. For the same 3DOFP model as described above, and bistable devices (Young Mechanisms) which induce stable input positions of $\psi_{i0}=0°$ and $\psi_{if}=30°$, the eight output positions are detailed in Table 1 below and shown graphically in FIG. 19.

TABLE 1

| Position Number | $\psi_1$ (deg) | $\psi_2$ (deg) | $\psi_3$ (deg) | Tilt | | Platform Center Position | | |
|---|---|---|---|---|---|---|---|---|
| | | | | $\xi$ (deg) | $\eta$ (deg) | z | r | $\theta$ (deg) |
| 1 | 0 | 0 | 0 | 0 | 0 | 0 | 0 | 0 |
| 2 | 0 | 0 | 30 | 60 | 42.6 | 0.34 | 0.13 | 60 |
| 3 | 0 | 30 | 0 | −60 | 42.6 | 0.34 | 0.13 | −60 |
| 4 | 0 | 30 | 30 | 0 | 35.7 | 0.75 | 0.04 | 180 |
| 5 | 30 | 0 | 0 | 180 | 42.6 | 0.34 | 0.13 | 180 |
| 6 | 30 | 0 | 30 | 120 | 35.7 | 0.75 | 0.04 | −60 |
| 7 | 30 | 30 | 0 | −120 | 35.7 | 0.75 | 0.04 | 60 |
| 8 | 30 | 30 | 30 | 0 | 0 | 0.89 | 0 | 0 |

Table 1 gives the input angles and the resulting tilt parameters of the platform (130). As used in Table 1, $\xi$ is the direction that the platform (130) tilts, and $\eta$ is the magnitude of the tilt in that direction. The location of the platform center is given in cylindrical coordinates, where r is the distance of the platform center from the z axis, and $\theta$ is the angle formed by the vector that measures the platform center's displacement from the z axis and the x axis.

Figure 19:
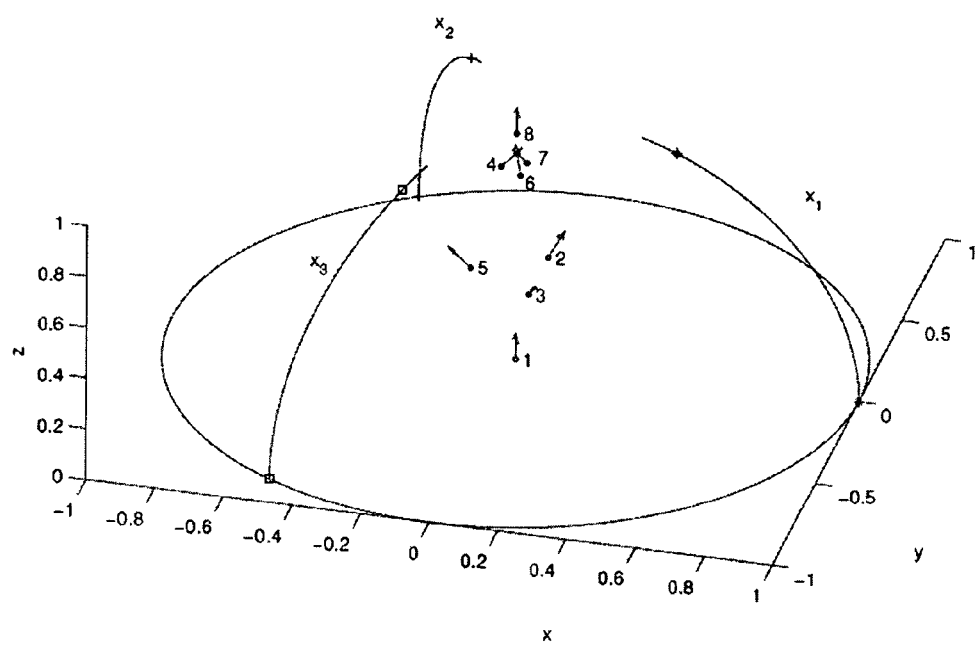
FIG. 19 illustrates the eight output positions of a multi-stable platform with two-stable positions for each input slider, according to one exemplary embodiment.

In FIG. 19 and Table 1, the platform positions are at the same height when a single input is at the second stable position. Likewise, the platform positions are at the same height when two of the inputs are at the second stable position. This implies that the translation of the platform in the z-direction is strongly dependent on the average of the input values $\psi_i$. The magnitude of the platform tilt appears to be strongly related to how skewed an input value is compared with the other two inputs. Thus, when all the inputs are the same value, the platform is not tilted. When one input value is different from the other two, the platform tilts in the plane of motion of the input $x_i$. When the different input is larger than the other two, the platform tilts away from the different input. When the different input is smaller than the other two, the platform tilts toward the different input.

The present disclosure has detailed the design of a novel device for the selective positioning of an out-of-plane link, such as a micro-mirror. A mathematical model for a position analysis of the out-of-plane positioner has been presented and a multistable version of the device has been described. The devices show that spherical kinematics can be used to produce a MEMS device, the MHKP, that has vertical travel with no side-to-side motion and a device, the SBM, that exhibits bistable out-of-plane motion. Model results predict that a 3DOFP will be able to move a platform with large amounts of vertical travel, significant tilt in any direction and minimal side to side motion.

The preceding description has been presented only to illustrate and describe embodiments of the present system and method. It is not intended to be exhaustive or to limit the system and method to any precise form disclosed. Many modifications and variations are possible in light of the above teaching. It is intended that the scope of the invention be defined by the following claims.

What is claimed is:

1. A platform structure, comprising:
    a substrate;
    a platform;
    a fixed point;
    a plurality of spherical mechanisms connected between the substrate and the platform, in which the plurality of spherical mechanisms support three dimensional motion of the platform over the substrate, each of the spherical mechanisms comprising a set of links, wherein said set of links comprise a plurality of pin joints forming hinges, each pin joint hinging about an axis in space that passes through said fixed point throughout a range of motion of each spherical mechanism; and wherein each of said plurality of spherical mechanisms are configured to convert in-plane motion to out-of-plane motion.

2. A platform structure, comprising:
    a substrate;
    a spherical input slider-crank mechanism comprising:
        a spherical input slider sliding along a path on said substrate defined by a segment of a theoretical reference sphere, said sphere having a center;
        a slider crank body attached to said spherical input slider and joined to said substrate by a fixed hinge, the fixed hinge rotating about an axis in space that passes through said center throughout motion of the spherical input slider-crank mechanism; and
        a release hinge disposed in said slider crank body between said fixed hinge and said spherical input slider, the release hinge rotating about an axis in space that passes through said center throughout motion of the spherical input slider-crank mechanism; and
    a platform coupled to said slider crank body, in which said spherical input slider-crank mechanism is configured to convert in-plane motion of said spherical input slider to out-of-plane motion of said platform.

3. The platform structure of claim 2, in which vertical translation of said platform is achieved without side-to-side translation of said platform.

4. The platform structure of claim 2, wherein said slider crank body is slideably coupled to said platform by a connection joint, said connection joint comprising slots in said platform, said slots comprising straight lines that are radially arrayed around said center of platform.

5. A platform structure, comprising:
    a substrate;

a fixed point;

a first, a second, and a third spherical input slider-crank mechanism, wherein each of said first, second, and third spherical input slider crank mechanism is coupled by a first end to said substrate, each of said spherical input slider-crank mechanisms comprising a plurality of pin joints forming hinges, each pin joint hinging about an axis in space that passes through said fixed point throughout a range of motion of each spherical input slider-crank mechanism; and a platform coupled to a second end of each of said first, second, and third spherical input slider-crank mechanism;

wherein each of said first, second, and third spherical input slider-crank mechanisms are configured to convert in-plane motion to out-of-plane motion.

6. The platform structure of claim 5, further comprising a platform actuator for moving said platform, wherein said platform actuator comprises a microelectromechanical system (MEMS).

7. The platform structure of claim 5, wherein each of said first, second, and third spherical input slider-crank mechanism comprises:

a fixed hinge disposed on said first end;

a slider crank body coupled to said fixed hinge, the fixed hinge rotating about an axis in space that passes through said fixed point;

an input slider disposed on said slider crank body opposite said fixed hinge; and a release hinge disposed in said slider crank body between said fixed hinge and said spherical input slider.

8. The platform structure of claim 7, wherein said second end of said first, second, and third spherical input slider-crank mechanisms is slideably coupled to said platform.

9. The platform structure of claim 8, in which said second end of said first, second, and third spherical input slider-crank mechanisms is slideably coupled to said platform by slots in said platform.

10. The platform structure of claim 9, in which said slots in said platform are straight lines that are radially arrayed around a center of platform.

11. The platform structure of claim 7, further comprising a single actuator; said single actuator is coupled to each of said input slider disposed on said slider crank body on each of said first, second, and third spherical input slider-crank mechanism.

12. The platform structure of claim 11, wherein said single actuator comprises a slider ring.

13. The platform structure of claim 7, further comprising an independent actuator coupled to each of said first, second, and third input slider.

14. The platform structure of claim 13, wherein each of said independent actuators comprises a bistable mechanism.

15. The platform structure of 14, wherein said bistable mechanisms comprise Young mechanisms.

16. A microelectromechanical system (MEMS), comprising:

a substrate;

a reflective surface coupled to said substrate;

a first, a second, and a third spherical input slider-crank mechanism, wherein each of said first, second, and third spherical input slider-crank mechanism includes a first end and a second end, a fixed hinge disposed on said first end, a slider crank body coupled to said fixed hinge, an input slider disposed on said slider crank body opposite said fixed hinge, and a release hinge disposed in said slider crank body between said fixed hinge and said input slider;

wherein each of said first, second, and third spherical input slider crank mechanism is coupled by said first end to said substrate; and a platform slideably coupled to said second end of each of said first, second, and third spherical input slider-crank;

wherein each of said first, second, and third spherical input slider-crank mechanisms are configured to convert in-plane motion to out-of-plane motion; wherein each of said fixed hinges rotate about a first axis in space and each of said release hinges rotate about a second axis in space, said first axis and said second axis intersecting throughout motion of the spherical input slider-crank mechanism at a fixed point.

17. The MEMS of claim 16, further comprising a single slider ring coupled to said input slider disposed on said slider crank body on each of said first, second, and third spherical input slider-crank mechanism.

18. The MEMS of claim 16, further comprising an independent actuator coupled to each of said first, second, and third input slider.

19. The MEMS of claim 18, wherein each of said independent actuators comprises a bistable Young mechanism.

20. The MEMS of claim 16, in which said release hinge comprises a male retention member and a female orifice, said male retention member retained within said female orifice to form said release hinge.

21. The MEMS of claim 16, in which each input slider slides along an arc on said substrate defined by a segment of theoretical reference sphere, said sphere having a center, said center corresponding to said fixed point.

\* \* \* \* \*

UNITED STATES PATENT AND TRADEMARK OFFICE
CERTIFICATE OF CORRECTION

| | | |
|---|---|---|
| PATENT NO. | : 8,336,421 B2 | Page 1 of 1 |
| APPLICATION NO. | : 11/496748 | |
| DATED | : December 25, 2012 | |
| INVENTOR(S) | : Craig Lusk et al. | |

It is certified that error appears in the above-identified patent and that said Letters Patent is hereby corrected as shown below:

In the Claims

Column 12, Line 46, Claim 21, change "slides along an are" to -- "slides along an arc"

Signed and Sealed this
Eleventh Day of June, 2013

Teresa Stanek Rea
*Acting Director of the United States Patent and Trademark Office*